(12) United States Patent
Arita

(10) Patent No.: US 9,297,457 B2
(45) Date of Patent: Mar. 29, 2016

(54) SEALING DEVICE

(71) Applicant: EAGLE INDUSTRY CO., LTD., Tokyo (JP)

(72) Inventor: Yasuhisa Arita, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 0 days.

(21) Appl. No.: 14/439,725

(22) PCT Filed: Dec. 25, 2013

(86) PCT No.: PCT/JP2013/084725
§ 371 (c)(1),
(2) Date: Apr. 30, 2015

(87) PCT Pub. No.: WO2014/119204
PCT Pub. Date: Aug. 7, 2014

(65) Prior Publication Data
US 2015/0276062 A1 Oct. 1, 2015

(30) Foreign Application Priority Data

Jan. 29, 2013 (JP) .................................. 2013-013942

(51) Int. Cl.
*F16J 15/32* (2006.01)
(52) U.S. Cl.
CPC ............ *F16J 15/322* (2013.01); *F16J 15/3216* (2013.01); *F16J 15/3228* (2013.01); *F16J 15/3268* (2013.01)

(58) Field of Classification Search
CPC ..... F16J 15/32; F16J 15/3208; F16J 15/3212; F16J 15/3216; F16J 15/322; F16J 15/3232; F16J 15/3248; F16J 15/3252; F16J 15/3268
See application file for complete search history.

(56) References Cited

U.S. PATENT DOCUMENTS

| 7,344,140 B2 * | 3/2008 | Ikeda ............................ 277/572 |
| 2002/0003338 A1 * | 1/2002 | Osumi et al. .................. 277/562 |

(Continued)

FOREIGN PATENT DOCUMENTS

| CN | 201339716 Y | 11/2009 |
| DE | 38 26 629 A1 | 2/1990 |

(Continued)

OTHER PUBLICATIONS

Chinese Office Action dated Dec. 18, 2015 with its partial translation.

*Primary Examiner* — Gilbert Lee
(74) *Attorney, Agent, or Firm* — Harness, Dickey & Pierce, P.L.C.

(57) ABSTRACT

A sealing device is capable of fixing an elastomeric seal relative to a support member without using an adhesive or an adaptor. The support member (120) is configured from a stepped annular member having a small diameter portion (121) on the sealed liquid side (L) and a large diameter portion (122) on the opposite side (A) intervened by the small diameter portion (121). The large diameter portion (122) being larger in outer diameter than the small diameter portion (121), and the elastomeric seal (110) has an interference with an inner peripheral surface of a shaft hole (31) of the housing (30) and an interference with each of the small diameter portion (121) and the large diameter portion (122), and is fixed in a state in which the elastomeric seal (110) is press-fitted in between the inner peripheral surface of the shaft hole (31) and the support member (120).

4 Claims, 2 Drawing Sheets

(56) References Cited

U.S. PATENT DOCUMENTS

| | | |
|---|---|---|
| 2002/0182072 A1 | 12/2002 | Kato et al. |
| 2009/0134585 A1 | 5/2009 | Shimomura et al. |
| 2010/0187770 A1* | 7/2010 | Miyake et al. ............... 277/562 |

FOREIGN PATENT DOCUMENTS

| | | |
|---|---|---|
| JP | 60-84863 | 6/1985 |
| JP | 2-130466 | 10/1990 |
| JP | 2002-364761 A | 12/2002 |
| JP | 2004-190844 A | 7/2004 |
| JP | 2006-183852 | 7/2006 |
| JP | 2009-127833 A | 6/2009 |
| JP | 2012-122534 | 6/2012 |
| WO | 2010061670 A1 | 3/2010 |

* cited by examiner

SEALING DEVICE

CROSS-REFERENCE TO RELATED APPLICATIONS

This application is a National Stage of International Application No. PCT/JP2013/084725, filed Dec. 25, 2013, which claims priority to Japanese Application No. 2013-013942, filed Jan. 29, 2013. The entire disclosures of each of the above applications are incorporated herein by reference.

FIELD

The present disclosure relates to a sealing device for sealing an annular gap between a shaft and a housing rotating relative to each other.

BACKGROUND

Conventionally, as a sealing device for sealing an annular gap between a shaft and a housing rotating relative to each other, there is known a sealing device that includes an elastomeric seal having a seal lip in slidable contact with the surface of the shaft, and a support member supporting the inner peripheral surface side of the elastomeric seal. Such a sealing device adopts various methods in order to fix the elastomeric seal in a state in which the seal is positioned relative to the support member. For example, there is known a method in which the elastomeric seal is vulcanization-molded integrally with the support member after an adhesive is applied to the support member (see Patent Literatures 1 and 2). In addition, there is also known a method in which the support member and the like are fixed by fitting a metal adaptor in a state in which the support member and the elastomeric seal are attached to attachment positions (see Patent Literature 3). Further, there is also known a method in which the support member is held by the elastomeric seal (see Patent Literature 4).

However, in the case of the method which uses the adhesive, when the sealing device is disposed of, the adhesive becomes a load to the environment. In addition, in the case where the sealing device is used in the water, a problem arises in that the adhesive is peeled due to time degradation.

In the case of the method which uses the adaptor, the number of components is increased due to the adaptor itself and a step for fitting the adaptor is needed, and hence a problem arises in that cost is increased. In addition, in case the sealing device needs to be installed in a narrow space, it may not be possible to secure a space in which the adaptor is fitted in the first place.

In the case where the support member is held by the elastomeric seal, a seal lip tends to be deformed. Accordingly, at a time of installing the sealing device or when a pressure on the sealed liquid side becomes negative, a problem arises in that the seal lip is significantly deformed toward the sealed liquid side and a sealing function is deteriorated.

CITATION LIST

Patent Literature

Patent Literature 1: Japanese Patent Application Laid-open No. 2004-190844
Patent Literature 2: Japanese Patent Application Laid-open No. 2006-183852
Patent Literature 3: WO 2010/061670
Patent Literature 4: Japanese Patent Application Laid-open No. 2009-127833

SUMMARY

Technical Problem

An object of the present disclosure is to provide a sealing device capable of fixing an elastomeric seal in the state in which the elastomeric seal is positioned relative to a support member without using an adhesive or an adaptor.

Solution to Problem

The present disclosure has adopted the following means in order to solve the above problem.

That is, the sealing device of the present disclosure is a sealing device for sealing an annular gap between a shaft and a housing rotating relative to each other, comprising: an elastomeric seal having a seal lip that is in slidable contact with a surface of the shaft; and a support member supporting an inner peripheral surface side of the elastomeric seal at a position on an opposite side of the seal lip from a sealed liquid side, wherein the support member is configured from a stepped annular member having a small diameter portion on the sealed liquid side and a large diameter portion on the opposite side from the sealed liquid side intervened by the small diameter portion, the large diameter portion being larger in outer diameter than the small diameter portion, and the elastomeric seal has an interference with an inner peripheral surface of a shaft hole of the housing and an interference with each of the small diameter portion and the large diameter portion, and is fixed in a state in which the elastomeric seal is press-fitted in between the inner peripheral surface of the shaft hole and the support member.

According to the present disclosure, since the elastomeric seal is fixed in the state in which the elastomeric seal is press-fitted, it is not necessary to fix the support member and the elastomeric seal to each other using an adhesive. Consequently, it is not necessary to use the adhesive that is a substance of environmental load. In addition, an adaptor is not needed. Further, since the elastomeric seal has the interference with the support member, it is possible to handle the support member and the elastomeric seal as one component by mounting the elastomeric seal to the support member. Consequently, the sealing device is superior in assembling workability.

In addition, on an outer peripheral surface side of the elastomeric seal, a first interference portion is provided on a radially outer side of a portion on the inner peripheral surface side having the interference with the small diameter portion and a second interference portion is provided on a radially outer side of a portion on the inner peripheral surface side having the interference with the large diameter portion, and an outer diameter of a portion between the first interference portion and the second interference portion may be set to be smaller than an inner diameter of the shaft hole.

Accordingly, it is possible to stably fix the elastomeric seal while suppressing the deformation of the seal lip. That is, in the elastomeric seal, it is possible to suppress the deformation of the seal lip with the help of the interference with the small diameter portion on the sealed liquid side and the first interference portion. And, with the interference with the large diameter portion and the second interference portion in the elastomeric seal, a high compression rate is achieved even with small interferences, and hence it is possible to increase a tightening force caused by press-fitting even with a short axial length. Accordingly, it becomes possible to stably fix the elastomeric seal without increasing the axial length. Further, the outer diameter of the portion between the first interference portion and the second interference portion is set to be smaller than the inner diameter of the shaft hole. As a result, when the elastomeric seal is installed into the shaft hole, it is possible to suppress an excessive deformation of the first interference portion and the second interference portion. Accordingly, it is possible to increase the positioning accuracy of the elastomeric seal.

The seal lip may be configured with a cylindrical base portion extending toward the sealed liquid side, and a lip tip portion extending toward the sealed liquid side and radially inwardly from the base portion and being in slidable contact with the surface of the shaft, and an inner peripheral surface side of the base portion is supported by the support member.

Accordingly, it is possible to effectively suppress the deformation of the seal lip. Consequently, in the case where the sealing device is installed or even in the case where the pressure on the sealed liquid side becomes negative, it is possible to suppress the deformation of the seal lip to thereby suppress deterioration of the sealing function. In addition, the support member exerts the function as a backup ring that suppresses the deformation of the seal lip toward the opposite side from the sealed liquid side.

Note that the above configurations can be used in combination as much as possible.

Advantageous Effects of the Disclosure

As described thus far, according to the present disclosure, it is possible to fix the elastomeric seal in the state in which it is positioned relative to the support member without using an adhesive or an adaptor.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

EXAMPLE

Figure 1:
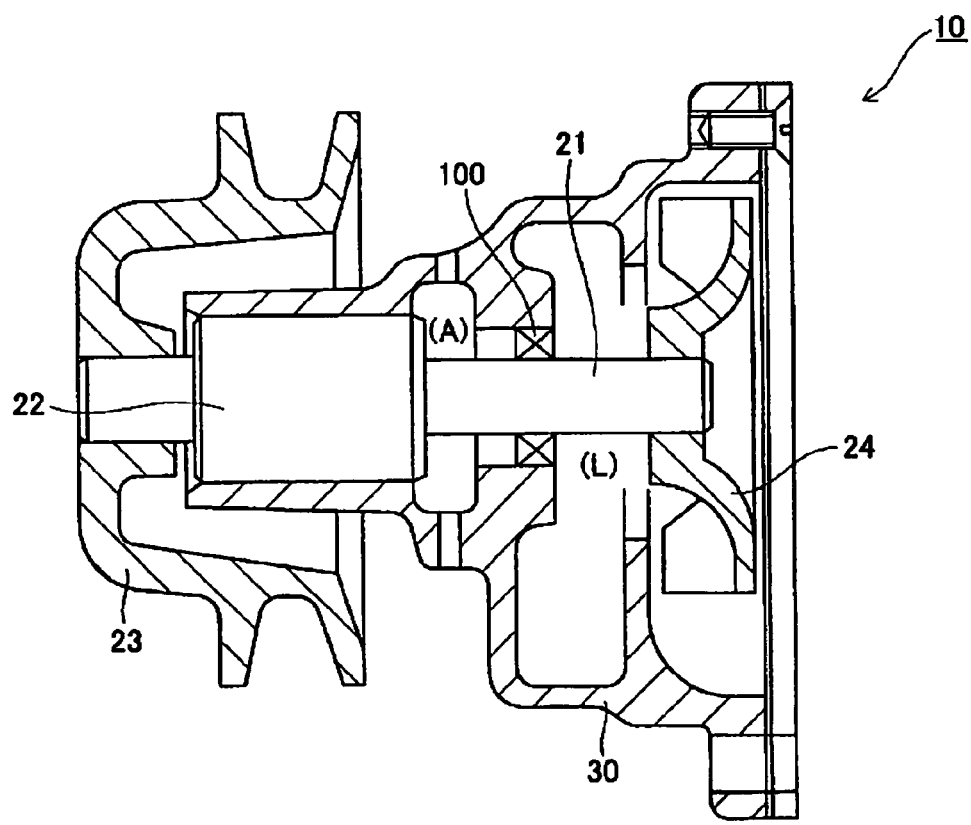
FIG. 1 is a schematic cross-sectional view showing an application example of a sealing device according to an example of the present disclosure.
Figure 2:
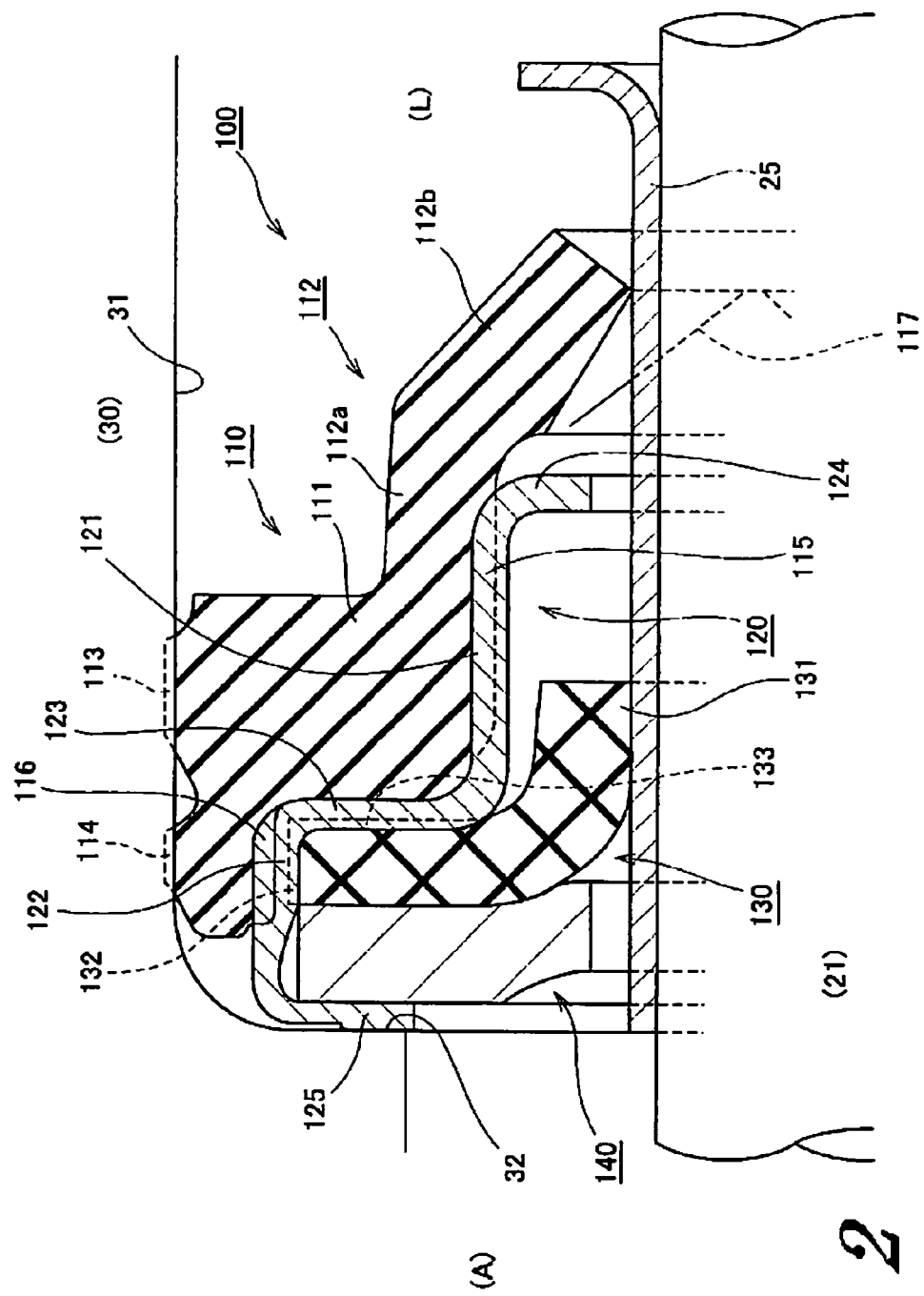
FIG. 2 is a schematic cross-sectional view showing the usage state of the sealing device according to the example of the present disclosure.

With reference to FIGS. 1 and 2, a sealing device according to the example of the present disclosure will be described.
<Application Example of Sealing Device>
With reference to FIG. 1, an application example of a sealing device 100 according to the example of the present disclosure will be described. FIG. 1 is a schematic cross-sectional view of a water pump 10 for an automobile. The water pump 10 includes a rotary shaft 21 and a housing 30 having a shaft hole into which the rotary shaft 21 is inserted. To the rotary shaft 21, a bearing 22 for smoothing the rotation of the rotary shaft 21 is attached. In addition, to one end side of the rotary shaft 21, a pulley 23 to which a rotational driving force is given by a belt (not shown) or the like is attached, and to the other end side thereof, an impeller 24 for sending cooling water (LLC) is attached. The sealing device 100 according to the present example is disposed in an annular gap between the rotary shaft 21 and the housing 30 in order to prevent leakage of the cooling water to the outside (i.e., an opposite side (A) from a sealed liquid side (L)). That is, in the present example, the sealed liquid is the cooling water.
<Configuration of Sealing Device>
With reference to FIG. 2, the sealing device 100 according to the example of the present disclosure will be described. Herein, FIG. 2 is a cross-sectional view intersected by a plane including the central axis line of the rotary shaft 21, and shows a cross section in a state in which the sealing device 100 is being used. Note that the sealing device 100 has a rotationally symmetrical shape except the configuration of a screw groove 117 described later, and any cross section is the same as long as the cross section includes the central axis line except the configuration of the screw groove 117.

In the present example, a sleeve 25 is attached to the rotary shaft 21, and the sealing device 100 seals an annular gap between an outer peripheral surface of the sleeve 25 made of metal such as stainless steel or the like and an inner peripheral surface of a shaft hole 31 in the housing 30. In addition, in the present example, a step is provided in the shaft hole 31 of the housing 30, and the sealing device 100 is installed so as to make an intimate contact with a step surface 32 of the shaft hole 31. Note it is preferable to provide a hardening treatment such as carburizing or nitriding to the outer peripheral surface of the sleeve 25 in order to prevent sliding wear.

The sealing device 100 is configured with an elastomeric seal 110, a support member 120 that supports the elastomeric seal 110, a resinous seal 130 that is provided on the inner peripheral surface side of the support member 120, and a metallic backup ring 140 that supports the resinous seal 130.

For the material of the elastomeric seal 110, a rubber material such as HNBR or the like is suitably used. The elastomeric seal 110 is configured with a body portion 111 and a seal lip 112 that is provided integrally on the sealed liquid side (L) of the body portion 111. On an outer peripheral surface side of the body portion 111, a first interference portion 113 and a second interference portion 114 are provided integrally, and on its inner peripheral surface side, a third interference portion 115 and a fourth interference portion 116 are provided integrally. The seal lip 112 is configured with a cylindrical base portion 112a that extends toward the sealed liquid side (L), and a lip tip portion 112b that extends toward the sealed liquid side (L) and radially inwardly from the base portion 112a and is in slidable contact with the shaft surface (the outer peripheral surface of the sleeve 25.) The screw groove 117 that exerts the function of returning the sealed liquid to the sealed liquid side (L) during the rotation of the rotary shaft 21 is provided on the inner peripheral surface side of the lip tip portion 112b.

For the material of the support member 120, a material having high stiffness such as metal including stainless steel or hard resin is used. The support member 120 is configured from a stepped annular member that has a small diameter portion 121 on the sealed liquid side (L) and a large diameter portion 122, that is larger in outer diameter than the small diameter portion 121, on the opposite side (A) from the sealed liquid side (L) intervened by the small diameter portion 121. The support member 120 supports the inner peripheral surface side of the elastomeric seal 110 using the outer peripheral surface sides of each of the small diameter portion 121 and the large diameter portion 122. Here, the outer peripheral surface side of the small diameter portion 121 supports not only the inner peripheral surface side of the body portion 111 of the elastomeric seal 110 but also the inner peripheral surface side of the base portion 112*a* of the seal lip 112.

The small diameter portion 121 and the large diameter portion 122 are connected with a step portion 123 that is perpendicular to an axial direction. On the sealed liquid side (L) and the opposite side (A) of the support member 120, inward flange portions 124 and 125 are provided.

Here, the third interference portion 115 of the elastomeric seal 110 as described is the interference portion with the small diameter portion 121 of the support member 120, and the fourth interference portion 116 is the interference portion with the large diameter portion 122 of the support member 120. That is, the inner diameter of the third interference portion 115 is set to be smaller than the outer diameter of the small diameter portion 121, and the inner diameter of the fourth interference portion 116 is set to be smaller than the outer diameter of the large diameter portion 122. In addition, the first interference portion 113 is provided on the radially outer side of the third interference portion 115 so that the first interference portion 113 is disposed so as to radially overlap (be at the same position as) the region of the third interference portion 115. Further, the second interference portion 114 is provided on the radially outer side of the fourth interference portion 116 so that the second interference portion 114 is disposed so as to radially overlap (be at the same position as) the region of the fourth interference portion 116. Each of the outer diameters of the first interference portion 113 and the second interference portion 114 is set to be larger than the inner diameter of the shaft hole 31. In addition, the outer diameter of a portion between the first interference portion 113 and the second interference portion 114 is set to be smaller than the inner diameter of the shaft hole 31. Note that, for the purpose of description, FIG. 2 shows the state of the elastomeric seal 110 when an external force is not applied to the elastomeric seal 110. Thus, each of the first interference portion 113, the second interference portion 114, the third interference portion 115, and the fourth interference portion 116 indicated by dotted lines is actually compressed in the installed state.

According to the configuration described above, the elastomeric seal 110 is fixed in the state in which the elastomeric seal 110 is press-fitted between the inner peripheral surface of the shaft hole 31 and the support member 120.

And the resinous seal 130 formed of PTFE or the like and the metallic backup ring 140 made from metal such as stainless steel or the like are provided on the inner peripheral surface side of the large diameter portion 122 of the support member 120. The resinous seal 130 includes a lip portion 131 that is in slidable contact with the shaft surface (the outer peripheral surface of the sleeve 25), an interference portion 132 with the inner peripheral surface of the large diameter portion 122 of the support member 120, and a compressed portion 133 that is compressed by the step portion 123. Note that, for the purpose of description, FIG. 2 shows the state of the resinous seal 130 when the external force is not applied to the resinous seal 130. Thus, each of the interference portion 132 and the compressed portion 133 indicated by the dotted lines is actually compressed in the installed state. According to the configuration described above, the resinous seal 130 and the backup ring 140 are fixed to the support member 120 by being sandwiched between the step portion 123 and the inner flange portion 124 of the support member 120.

(Advantages of the Sealing Device According to the Example)

According to the sealing device 100 of the present example, since the elastomeric seal 110 is fixed in the state in which the elastomeric seal 110 is press-fitted, it is not necessary to fix the support member 120 and the elastomeric seal 110 to each other with an adhesive. Thus, it is not necessary to use the adhesive that is a substance of environmental load. In addition, unlike the conventional sealing device, an adaptor is not necessary, as well. Further, the elastomeric seal 110 has the interferences (the third interference portion 115 and the fourth interference portion 116) with the support member 120. Consequently, by attaching the elastomeric seal 110 to the support member 120, it becomes possible to handle the support member 120 and the elastomeric seal 110 as one component. Furthermore, in the present example, the resinous seal 130 and the backup ring 140 are also fixed to the support member 120. Thus, it is possible to handle these four members as one component. Consequently, the sealing device 100 is superior in assembling workability.

In addition, the present example adopts the configuration in which the first interference portion 113, the second interference portion 114, the third interference portion 115, and the fourth interference portion 116 are provided on the elastomeric seal 110. Accordingly, it is possible to stably fix the elastomeric seal 110 while suppressing the deformation of the seal lip 112. That is, in the elastomeric seal 110, it is possible to suppress the deformation of the seal lip 112 using the third interference portion 115 and the first interference portion 113 on the sealed liquid side (L). And, according to the fourth interference portion 116 with the large diameter portion 122 and the second interference portion 114, a high compression rate is achieved even with small interferences, and hence it is possible to increase a tightening force caused by press-fitting even with a short axial length. Accordingly, it becomes possible to stably fix the elastomeric seal 110 without increasing the axial length. Further, the outer diameter of the portion between the first interference portion 113 and the second interference portion 114 is set to be smaller than the inner diameter of the shaft hole 31. As a result, when the elastomeric seal 110 is installed into the shaft hole 31, it is possible to suppress an excessive deformation of the first interference portion 113 and the second interference portion 114. Accordingly, it is possible to increase the positioning accuracy of the elastomeric seal 110.

Further, the present example adopts the configuration in which the inner peripheral surface side of the base portion 112*a* of the seal lip 112 is supported by the support member 120. Accordingly, the deformation of the seal lip 112 is effectively suppressed. Consequently, in the case where the sealing device 100 is installed or even in the case where the pressure on the sealed liquid side (L) becomes negative, it is possible to suppress the deformation of the seal lip 112 to thereby suppress deterioration of the sealing function. In addition, the support member 120 exerts the function as a backup ring that suppresses the deformation of the seal lip 112 toward the opposite side (A) from the sealed liquid side (L).

(Others)

In the above-described example, the description has been given by using the case where the sealing device is used in the water pump 10 for an automobile as the application example of the sealing device. However, the present disclosure can be applied to various devices with the need to seal an annular gap between the shaft and the housing rotating relative to each other. In addition, in the example as described above, the case where the sleeve 25 is attached to the rotary shaft 21 is exemplified, but the present disclosure can be adopted to the case where the seal lip of the elastomeric seal is in slidable contact directly with the surface of the shaft.

REFERENCE SIGNS LIST 10 water pump
21 rotary shaft
22 bearing
23 pulley
24 impeller
25 sleeve
30 housing
31 shaft hole
32 step surface
100 sealing device
110 elastomeric seal
111 body portion
112 seal lip
112a base portion
112b lip tip portion
113 first interference portion
114 second interference portion
115 third interference portion
116 fourth interference portion
117 screw groove
120 support member
121 small diameter portion
122 large diameter portion
123 step portion
124, 125 inward flange portion
130 resinous seal
131 lip portion
132 interference portion
133 compressed portion
140 backup ring

The invention claimed is:

1. A sealing device for sealing an annular gap between a shaft and a housing rotating relative to each other, comprising:
    an elastomeric seal having a seal lip that is in slidable contact with a surface of the shaft; and
    a support member supporting an inner peripheral surface side of the elastomeric seal at a position on an opposite side of the seal lip from a sealed liquid side, wherein
    the support member is configured from a stepped annular member having a small diameter portion on the sealed liquid side, a step portion extending radially outwardly from the small diameter portion, and a large diameter portion extending toward an opposite side of the sealed liquid side from the step portion, the large diameter portion being larger in outer diameter than the small diameter portion, and
    the elastomeric seal has an interference with an inner peripheral surface of a shaft hole of the housing, an interference with the small diameter portion and an interference with the large diameter portion, and is fixed in a state in which the elastomeric seal is press-fitted in between the inner peripheral surface of the shaft hole and the support member.

2. The sealing device according to claim 1, wherein
on an outer peripheral surface side of the elastomeric seal, a first interference portion is provided on a radially outer side of a portion on the inner peripheral surface side having the interference with the small diameter portion and a second interference portion is provided on a radially outer side of a portion on the inner peripheral surface side having the interference with the large diameter portion, and an outer diameter of a portion between the first interference portion and the second interference portion is set to be smaller than an inner diameter of the shaft hole.

3. The sealing device according to claim 1, wherein
the seal lip is configured with a cylindrical base portion extending toward the sealed liquid side, and a lip tip portion extending toward the sealed liquid side and radially inwardly from the base portion and being in slidable contact with the surface of the shaft, and an inner peripheral surface side of the base portion is supported by the support member.

4. The sealing device according to claim 2, wherein
the seal lip is configured with a cylindrical base portion extending toward the sealed liquid side, and a lip tip portion extending toward the sealed liquid side and radially inwardly from the base portion and being in slidable contact with the surface of the shaft, and an inner peripheral surface side of the base portion is supported by the support member.

* * * * *